US010721057B2

(12) United States Patent
Carr

(10) Patent No.: US 10,721,057 B2
(45) Date of Patent: Jul. 21, 2020

(54) DYNAMIC CHANNELS IN SECURE QUERIES AND ANALYTICS

(71) Applicant: Enveil, Inc., Fulton, MD (US)

(72) Inventor: Ryan Carr, Fulton, MD (US)

(73) Assignee: Enveil, Inc., Fulton, MD (US)

( * ) Notice: Subject to any disclaimer, the term of this patent is extended or adjusted under 35 U.S.C. 154(b) by 240 days.

(21) Appl. No.: 15/876,063

(22) Filed: Jan. 19, 2018

(65) Prior Publication Data

US 2018/0270046 A1 Sep. 20, 2018

Related U.S. Application Data

(60) Provisional application No. 62/448,916, filed on Jan. 20, 2017, provisional application No. 62/448,883, (Continued)

(51) Int. Cl.
*H04L 9/00* (2006.01)
*H04L 9/30* (2006.01)
(Continued)

(52) U.S. Cl.
CPC ............ *H04L 9/008* (2013.01); *G06F 1/0307* (2013.01); *G06F 7/552* (2013.01); *G06F 7/723* (2013.01);
(Continued)

(58) Field of Classification Search
CPC combination set(s) only.
See application file for complete search history.

(56) References Cited

U.S. PATENT DOCUMENTS

| 5,732,390 A | 3/1998 | Katayanagi et al. |
| 6,178,435 B1 | 1/2001 | Schmookler |

(Continued)

FOREIGN PATENT DOCUMENTS

| EP | 2873186 B1 | 3/2018 |
| JP | 5680007 B2 | 3/2015 |

(Continued)

OTHER PUBLICATIONS

Drucker et al. "Paillier-encrypted databases with fast aggregated queries", 978-1-5090-6196-9/17 IEEE 2017.*
(Continued)

*Primary Examiner* — Piotr Poltorak
(74) *Attorney, Agent, or Firm* — Carr & Ferrell LLP

(57) ABSTRACT

Systems and methods for end-to-end encryption and dynamic resizing and encoding into grouped byte channels are described herein. A query is homomorphically encrypted at a client using dynamic channel techniques. The encrypted query is sent without a private key to a server for evaluation over target data to generate encrypted response without decrypting the encrypted query. The result elements of the encrypted response are grouped, co-located, and dynamically resized and encoded into grouped byte channels using the dynamic channel techniques, without decrypting the encrypted query or the encrypted response. The encrypted response is sent to the client where the client uses the private key and channel extraction techniques associated with the dynamic channel techniques to decrypt and perform channel extraction on the encrypted response to obtain the results of the query without revealing the query or results to a target data owner, an observer, or an attacker.

20 Claims, 4 Drawing Sheets

Related U.S. Application Data filed on Jan. 20, 2017, provisional application No. 62/448,885, filed on Jan. 20, 2017, provisional application No. 62/462,818, filed on Feb. 23, 2017.

(51) Int. Cl.

| | |
|---|---|
| H04L 29/06 | (2006.01) |
| G06F 7/552 | (2006.01) |
| G06F 1/03 | (2006.01) |
| G06F 7/72 | (2006.01) |
| G06F 9/30 | (2018.01) |
| H03M 7/24 | (2006.01) |

(52) U.S. Cl.
CPC .......... *G06F 7/728* (2013.01); *G06F 9/30014* (2013.01); *H03M 7/24* (2013.01); *H04L 9/30* (2013.01); *H04L 63/0428* (2013.01); *H04L 63/0442* (2013.01); *H04L 2209/30* (2013.01)

(56) References Cited

U.S. PATENT DOCUMENTS

| | | |
|---|---|---|
| 6,745,220 B1 | 6/2004 | Hars |
| 6,748,412 B2 | 6/2004 | Ruehle |
| 6,910,059 B2 | 6/2005 | Lu et al. |
| 7,712,143 B2 | 5/2010 | Comlekoglu |
| 7,937,270 B2 | 5/2011 | Smaragdis et al. |
| 8,515,058 B1 | 8/2013 | Gentry |
| 8,565,435 B2 | 10/2013 | Gentry et al. |
| 8,781,967 B2 | 7/2014 | Tehranchi et al. |
| 8,832,465 B2 | 9/2014 | Gulati et al. |
| 9,059,855 B2 | 6/2015 | Johnson et al. |
| 9,094,378 B1 | 7/2015 | Yung et al. |
| 9,189,411 B2 | 11/2015 | Mckeen et al. |
| 9,215,219 B1 | 12/2015 | Krendelev et al. |
| 9,288,039 B1 | 3/2016 | Monet et al. |
| 9,491,111 B1 | 11/2016 | Roth et al. |
| 9,503,432 B2* | 11/2016 | El Emam ................ G06F 16/86 |
| 9,514,317 B2 | 12/2016 | Martin et al. |
| 9,565,020 B1 | 2/2017 | Camenisch et al. |
| 9,577,829 B1 | 2/2017 | Roth et al. |
| 9,652,609 B2 | 5/2017 | Kang et al. |
| 9,846,787 B2 | 12/2017 | Johnson et al. |
| 9,852,306 B2* | 12/2017 | Cash ................ G06F 21/6227 |
| 9,942,032 B1 | 4/2018 | Kornaropoulos et al. |
| 9,946,810 B1 | 4/2018 | Trepetin et al. |
| 9,973,334 B2 | 5/2018 | Hibshoosh et al. |
| 10,027,486 B2 | 7/2018 | Liu |
| 10,055,602 B2* | 8/2018 | Deshpande ........... H04L 9/0618 |
| 10,073,981 B2 | 9/2018 | Arasu et al. |
| 10,075,288 B1* | 9/2018 | Khedr ................... H04L 9/008 |
| 10,129,028 B2 | 11/2018 | Kamakari et al. |
| 10,148,438 B2* | 12/2018 | Evancich .............. H04L 9/3226 |
| 10,181,049 B1* | 1/2019 | El Defrawy ......... G06F 21/6245 |
| 10,210,266 B2 | 2/2019 | Antonopoulos et al. |
| 10,235,539 B2* | 3/2019 | Ito .......................... G06F 21/62 |
| 10,255,454 B2* | 4/2019 | Kamara .............. G06F 21/6227 |
| 10,333,715 B2 | 6/2019 | Chu et al. |
| 10,375,042 B2 | 8/2019 | Chaum |
| 10,396,984 B2 | 8/2019 | French et al. |
| 10,423,806 B2 | 9/2019 | Cerezo Sanchez |
| 10,489,604 B2* | 11/2019 | Yoshino ................ G06F 16/35 |
| 10,496,631 B2* | 12/2019 | Tschudin .............. H04L 9/0894 |
| 10,644,876 B2 | 5/2020 | Williams et al. |
| 2002/0032712 A1 | 3/2002 | Miyasaka et al. |
| 2002/0104002 A1* | 8/2002 | Nishizawa .......... H04L 63/0428 |
| | | 713/168 |
| 2003/0059041 A1 | 3/2003 | MacKenzie et al. |
| 2005/0008152 A1 | 1/2005 | MacKenzie |
| 2005/0076024 A1* | 4/2005 | Takatsuka .............. G06F 16/20 |
| 2005/0259817 A1 | 11/2005 | Ramzan et al. |
| 2007/0053507 A1 | 3/2007 | Smaragdis et al. |
| 2007/0095909 A1* | 5/2007 | Chaum ................ G07C 13/00 |
| | | 235/386 |
| 2007/0140479 A1 | 6/2007 | Wang et al. |
| 2007/0143280 A1 | 6/2007 | Wang et al. |
| 2009/0037504 A1 | 2/2009 | Hussain |
| 2009/0193033 A1* | 7/2009 | Ramzan ................ G06F 7/723 |
| 2009/0268908 A1 | 10/2009 | Bikel et al. |
| 2009/0279694 A1 | 11/2009 | Takahashi et al. |
| 2010/0202606 A1 | 8/2010 | Almeida |
| 2010/0205430 A1* | 8/2010 | Chiou ................... G06Q 10/10 |
| | | 713/156 |
| 2011/0026781 A1 | 2/2011 | Osadchy et al. |
| 2011/0107105 A1 | 5/2011 | Hada |
| 2011/0110525 A1* | 5/2011 | Gentry ................ H04L 9/0822 |
| | | 380/285 |
| 2011/0243320 A1 | 10/2011 | Halevi et al. |
| 2011/0283099 A1 | 11/2011 | Nath et al. |
| 2012/0039469 A1 | 2/2012 | Meuller et al. |
| 2012/0054485 A1 | 3/2012 | Tanaka et al. |
| 2012/0066510 A1 | 3/2012 | Weinman |
| 2012/0201378 A1 | 8/2012 | Nabeel et al. |
| 2013/0010950 A1* | 1/2013 | Kerschbaum ........... H04L 9/008 |
| | | 380/30 |
| 2013/0051551 A1 | 2/2013 | El Aimani |
| 2013/0054665 A1 | 2/2013 | Felch |
| 2013/0170640 A1 | 7/2013 | Gentry |
| 2013/0191650 A1 | 7/2013 | Balakrishnan et al. |
| 2013/0195267 A1 | 8/2013 | Alessio et al. |
| 2013/0216044 A1 | 8/2013 | Gentry et al. |
| 2013/0230168 A1* | 9/2013 | Takenouchi ........ G06F 21/6209 |
| | | 380/46 |
| 2013/0246813 A1 | 9/2013 | Mori et al. |
| 2013/0326224 A1 | 12/2013 | Yavuz |
| 2013/0339722 A1 | 12/2013 | Krendelev et al. |
| 2013/0339751 A1* | 12/2013 | Sun ........................ H04L 9/008 |
| | | 713/189 |
| 2013/0346741 A1 | 12/2013 | Kim et al. |
| 2013/0346755 A1 | 12/2013 | Nguyen et al. |
| 2014/0189811 A1 | 7/2014 | Taylor et al. |
| 2014/0233727 A1 | 8/2014 | Rohloff et al. |
| 2014/0355756 A1* | 12/2014 | Iwamura ................ H04L 9/008 |
| | | 380/30 |
| 2015/0100785 A1 | 4/2015 | Joye et al. |
| 2015/0100794 A1 | 4/2015 | Joye et al. |
| 2015/0205967 A1* | 7/2015 | Naedele ................ G06F 21/606 |
| | | 713/189 |
| 2015/0215123 A1 | 7/2015 | Kipnis et al. |
| 2015/0227930 A1 | 8/2015 | Quigley et al. |
| 2015/0229480 A1 | 8/2015 | Joye et al. |
| 2015/0244517 A1* | 8/2015 | Nita ...................... H04L 9/008 |
| | | 713/168 |
| 2015/0248458 A1 | 9/2015 | Sakamoto |
| 2015/0304736 A1 | 10/2015 | Lal et al. |
| 2015/0358152 A1 | 12/2015 | Ikarashi et al. |
| 2016/0004874 A1 | 1/2016 | Ioannidis et al. |
| 2016/0072623 A1 | 3/2016 | Joye et al. |
| 2016/0105402 A1 | 4/2016 | Kupwade-Patil et al. |
| 2016/0105414 A1 | 4/2016 | Bringer et al. |
| 2016/0119346 A1 | 4/2016 | Chen et al. |
| 2016/0140348 A1 | 5/2016 | Nawaz et al. |
| 2016/0179945 A1 | 6/2016 | Lastra Diaz et al. |
| 2016/0182222 A1* | 6/2016 | Rane ...................... H04L 9/008 |
| | | 713/168 |
| 2016/0323098 A1 | 11/2016 | Bathen |
| 2016/0335450 A1* | 11/2016 | Yoshino ................ H04L 9/008 |
| 2016/0344557 A1 | 11/2016 | Chabanne et al. |
| 2016/0350648 A1 | 12/2016 | Gilad-Bachrach et al. |
| 2017/0070340 A1 | 3/2017 | Hibshoosh et al. |
| 2017/0070351 A1 | 3/2017 | Yan |
| 2017/0099133 A1 | 4/2017 | Gu et al. |
| 2017/0134158 A1 | 5/2017 | Pasol et al. |
| 2017/0185776 A1 | 6/2017 | Robinson et al. |
| 2017/0264426 A1 | 9/2017 | Joye et al. |
| 2018/0091466 A1 | 3/2018 | Friedman et al. |
| 2018/0139054 A1 | 5/2018 | Chu et al. |
| 2018/0198601 A1* | 7/2018 | Laine ...................... H04L 9/008 |
| 2018/0204284 A1 | 7/2018 | Cerezo Sanchez |
| 2018/0212751 A1 | 7/2018 | Williams et al. |
| 2018/0212752 A1 | 7/2018 | Williams et al. |
| 2018/0212753 A1 | 7/2018 | Williams |

(56) References Cited

U.S. PATENT DOCUMENTS

| | | | |
|---|---|---|---|
| 2018/0212754 | A1 | 7/2018 | Williams et al. |
| 2018/0212755 | A1 | 7/2018 | Williams et al. |
| 2018/0212756 | A1 | 7/2018 | Carr |
| 2018/0212757 | A1* | 7/2018 | Carr .................. H04L 63/0442 |
| 2018/0212758 | A1 | 7/2018 | Williams et al. |
| 2018/0212759 | A1 | 7/2018 | Williams et al. |
| 2018/0212775 | A1 | 7/2018 | Williams |
| 2018/0212933 | A1 | 7/2018 | Williams |
| 2018/0224882 | A1 | 8/2018 | Carr |
| 2018/0234254 | A1 | 8/2018 | Camenisch et al. |
| 2018/0267981 | A1* | 9/2018 | Sirdey ................ G01C 21/343 |
| 2018/0276417 | A1 | 9/2018 | Cerezo Sanchez |
| 2018/0343109 | A1 | 11/2018 | Koseki et al. |
| 2018/0359097 | A1 | 12/2018 | Lindell |
| 2018/0373882 | A1 | 12/2018 | Veugen |
| 2019/0013950 | A1 | 1/2019 | Becker et al. |
| 2019/0042786 | A1 | 2/2019 | Williams et al. |
| 2019/0108350 | A1 | 4/2019 | Bohli et al. |
| 2019/0158272 | A1 | 5/2019 | Chopra et al. |
| 2019/0229887 | A1 | 7/2019 | Ding et al. |
| 2019/0238311 | A1 | 8/2019 | Zheng |
| 2019/0251553 | A1 | 8/2019 | Ma et al. |
| 2019/0251554 | A1 | 8/2019 | Ma et al. |
| 2019/0253235 | A1 | 8/2019 | Zhang et al. |
| 2019/0260585 | A1 | 8/2019 | Kawai et al. |
| 2019/0280880 | A1 | 9/2019 | Zhang et al. |
| 2019/0312728 | A1 | 10/2019 | Poeppelmann |
| 2019/0327078 | A1 | 10/2019 | Zhang et al. |
| 2019/0334716 | A1 | 10/2019 | Kocsis et al. |
| 2019/0349191 | A1 | 11/2019 | Soriente et al. |
| 2019/0371106 | A1 | 12/2019 | Kaye |
| 2020/0134200 | A1 | 4/2020 | Williams et al. |
| 2020/0150930 | A1 | 5/2020 | Carr et al. |

FOREIGN PATENT DOCUMENTS

| | | |
|---|---|---|
| KR | 101386294 B1 | 4/2014 |
| WO | WO2014105160 A1 | 7/2014 |
| WO | WO2015094261 A1 | 6/2015 |
| WO | WO2016003833 A1 | 1/2016 |
| WO | WO2016018502 A1 | 2/2016 |
| WO | WO2018091084 A1 | 5/2018 |
| WO | WO2018136801 A1 | 7/2018 |
| WO | WO2018136804 A1 | 7/2018 |
| WO | WO2018136811 A1 | 7/2018 |

OTHER PUBLICATIONS

Tu et al. "Processing Analytical Queries over Encrypted Data", Proceedings of the VLDB Endowment, vol. 6, No. 5 2150-8097/13/03, 2013.*

Boneh et al., "Private Database Queries Using Somewhat Homomorphic Encryption", Cryptology ePrint Archive: Report 2013/422, Standford University, 2013.*

Chen et al., "Efficient Multi-Key Homomorphic Encryption with Packed Ciphertexts with Application to Oblivious Neural Network Inference", CCS '19 Proceedings of the 2019 ACM SIGSAC Conference on Computer and Communications Security pp. 395-412, 2019.*

Armknecht et al., "A Guide to Fully Homomorphic Encryption", IACR Cryptology ePrint Archive, 2015.*

Bayar et al., "A Deep Learning Approach to Universal Image Manipulation Detection Using a New Convolutional Layer", IH&MMSec 2016, ISBN 978-1-4503-4290-2/16/06,. 2016.*

Juvekar et al. "Gazelle: A Low Latency Framework for Secure Neural Network Inference", 27th USENIX Security Symposium, Aug. 2018.*

"International Search Report" and "Written Opinion of the International Searching Authority," Patent Cooperation Treaty Application No. PCT/US2018/014535, dated Apr. 19, 2018, 9 pages.

"International Search Report" and "Written Opinion of the International Searching Authority," Patent Cooperation Treaty Application No. PCT/US2018/014530, dated Apr. 23, 2018, 7 pages.

"International Search Report" and "Written Opinion of the International Searching Authority," Patent Cooperation Treaty Application No. PCT/US2018/014551, dated Apr. 24, 2018, 8 pages.

Bösch et al., "SOFIR: Securely Outsourced Forensic Recognition," 2014 IEEE International Conference on Acoustic, Speech and Signal Processing (ICASSP), IEEE 978-1-4799-2893-4/14, 2014, pp. 2713-2717.

Waziri et al., "Big Data Analytics and Data Security in the Cloud via Fullly Homomorphic Encryption," World Academy of Science, Engineering and Technology International Journal of Computer, Electrical, Automation, Control and Information Engineering, vol. 9, No. 3, 2015, pp. 744-753.

Bajpai et al., "A Fully Homomorphic Encryption Implementation on Cloud Computing," International Journal of Information & Computation Technology, ISSN 0974-2239 vol. 4, No. 8, 2014, pp. 811-816.

Petition to Insitute Derivation Proceeding Pursuant to 35 USC 135; Case No. DER2019-00009, US Patent and Trademark Office Patent Trial and Appeal Board; Jul. 26, 2019, 272 pages. (2 PDFs).

SCAMP Working Paper L29/11, "A Woods Hole Proposal Using Striping," Dec. 2011, 14 pages.

O'Hara, Michael James, "Shovel-ready Private Information Retrieval," Dec. 2015, 4 pages.

Carr, Benjamin et al., "Proposed Laughing Owl," NSA Technical Report, Jan. 5, 2016, 18 pages.

Williams, Ellison Anne et al., "Wideskies: Scalable Private Informaton Retrieval," 14 pages.

Carr, Benjamin et al., "A Private Stream Search Technique," NSA Technical Report, Dec. 1, 2015, 18 pages.

Viejo et al., "Asymmetric homomorphisms for secure aggregation in heterogeneous scenarios," Information Fusion 13, Elsevier B.V., Mar. 21, 2011, pp. 285-295.

Patil et al, "Big Data Privacy Using Fully Homomorphic Non-Deterministic Encryption," IEEE 7th International Advance Computing Conference, Jan. 5-7, 2017, 15 pages.

* cited by examiner

DYNAMIC CHANNELS IN SECURE QUERIES AND ANALYTICS

CROSS REFERENCE TO RELATED APPLICATIONS

This application claims the benefit and priority of U.S. Provisional Application Ser. No. 62/448,916, filed on Jan. 20, 2017; U.S. Provisional Application Ser. No. 62/448,883, filed on Jan. 20, 2017; U.S. Provisional Application 62/448,885, filed on Jan. 20, 2017; and U.S. Provisional Application Ser. No. 62/462,818, filed on Feb. 23, 2017, all of which are hereby incorporated by reference herein, including all references and appendices, for all purposes.

FIELD OF THE PRESENT TECHNOLOGY

The present disclosure relates to the technical field of encryption and decryption methods and apparatus as applied to computing systems. More particularly, the present invention is in the technical field of homomorphic encryption methods and apparatus.

SUMMARY

The present invention is a method for dynamically resizing the byte channels encoded in a homomorphic encryption query or analytic in order to maximize usage of plaintext space available in the query, thereby reducing the size of the encrypted response.

Various embodiments of the present technology include a method of receiving at one or more servers an encrypted analytic from one or more clients, the analytic encrypted using a homomorphic encryption scheme utilizing dynamic channel techniques; evaluating the encrypted analytic over a target data source without decrypting the encrypted analytic; grouping similar result elements of encrypted analytic evaluation based on a probability that the result elements are similar; co-locating two or more groups of result elements on a server based on a probability that the result elements are similar; converting the grouped result elements into byte streams; dynamically resizing and encoding the similar result elements into grouped byte channels of data elements using the dynamic channel techniques; evaluating the encrypted analytic over each of the dynamic byte channels of data elements to generate an encrypted response, without decrypting the encrypted response and without decrypting the encrypted analytic; sending the encrypted response from the one or more servers to the one or more clients; and decrypting and performing channel extraction at the one or more clients using channel extraction techniques associated with the dynamic channel techniques to obtain results of the analytic from the encrypted response.

Various embodiments of the present technology include a system including a client configured to encrypt an analytic using a homomorphic encryption scheme that utilizes data channel techniques and an encryption key associated with the homomorphic encryption scheme, send the encrypted analytic to a server without the encryption key, decrypt an encrypted response using the homomorphic encryption scheme and the key, and perform channel extraction on the encrypted response using channel extraction techniques associated with the dynamic channel techniques. The system further includes a server configured to receive the encrypted analytic without the encryption key from the client via a network, evaluate the encrypted analytic over a target data source without decrypting the encrypted analytic, group similar result elements of the target data source evaluation based on a probability that the result elements are similar, co-locate similar result elements from another server based on a probability that the result elements are similar, convert the result elements into byte streams, dynamically resize and encode the similar result elements into grouped byte channels of data elements using the dynamic channel techniques, evaluate the encrypted analytic over each dynamic byte channel of data elements to generate the encrypted response, without decrypting the encrypted analytic and without decrypting the encrypted response, and send the encrypted response to the client for decryption and channel extraction on the encrypted response to obtain the results of the analytic over the target data source.

Various embodiments of the present technology include a non-transitory computer readable storage media having a program embodied thereon, the program being executable by a processor to perform a method for secure analytics of a target data source, the method comprising: receiving an encrypted analytic from a client via a network, the analytic encrypted at the client using a homomorphic encryption scheme and a public encryption key that utilize data channel techniques, the encrypted analytic received without a corresponding private encryption key; evaluating the encrypted analytic over the target data source to generate encrypted result elements without decrypting the encrypted analytic; grouping similar result elements of the encrypted analytic evaluation based on a probability that the result elements are similar without decrypting the result elements; co-locating two or more groups of result elements on the server based on a probability that the result elements are similar; converting the grouped result elements into byte streams; dynamically resizing and encoding the similar result elements into grouped byte channels of data elements using the data channel techniques; evaluating the encrypted analytic over each dynamic byte channel of data elements to generate an encrypted response having a reduced size, without decrypting the encrypted analytic and without decrypting the encrypted response; and sending the encrypted response to the client, the encrypted response configured for decryption and channel extraction using channel extraction techniques associated with the dynamic channel techniques, to obtain a result of the encrypted response.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Homomorphic encryption is a form of encryption in which a specific algebraic operation (generally referred to as addition or multiplication) performed on data is equivalent to another operation performed on the encrypted form of data. For example, in Partially Homomorphic Encryption (PHE) schemes, multiplication performed on data such as ciphertext is equal to addition of the same values in plaintext. Thus, a specific operation performed on homomorphically encrypted data (e.g., an analytic) may generate an encrypted result which, when decrypted, allows recovery of the result of the operation as if it had been performed on the unencrypted data. For example, a homomorphically encrypted analytic such as a query may be evaluated using target data to generate an encrypted response. The encrypted response may be decrypted, and the decrypted response may be used to recover the evaluation of the query as if it had been evaluated over the target data using the unencrypted query.

Homomorphic encryption can also be used to securely chain together multiple operations on homomorphically encrypted data without exposing unencrypted data. The result of the multiple chained operations can then be recovered as if the multiple operations had been performed on the unencrypted data. It is noteworthy that if one of those multiple operations is a dynamically resizing and encoding byte streams into grouped byte channels, the data may be recovered as if the dynamic resizing and encoding had been performed on unencrypted data. For example, a query may be homorphically encrypted using dynamic channel techniques. Target data may be grouped, co-located, converted to byte streams, and dynamically resized and encoded into grouped byte channels using the dynamic channel techniques. Then the homomorphically encrypted query may be evaluated over each dynamic byte channel of data elements generating an encrypted query response. The result of the query evaluation may be recovered using decryption and channel extraction as if the query evaluation, data channel techniques, and dynamic resizing and encoding had been performed on an unencrypted query.

Figure 1:
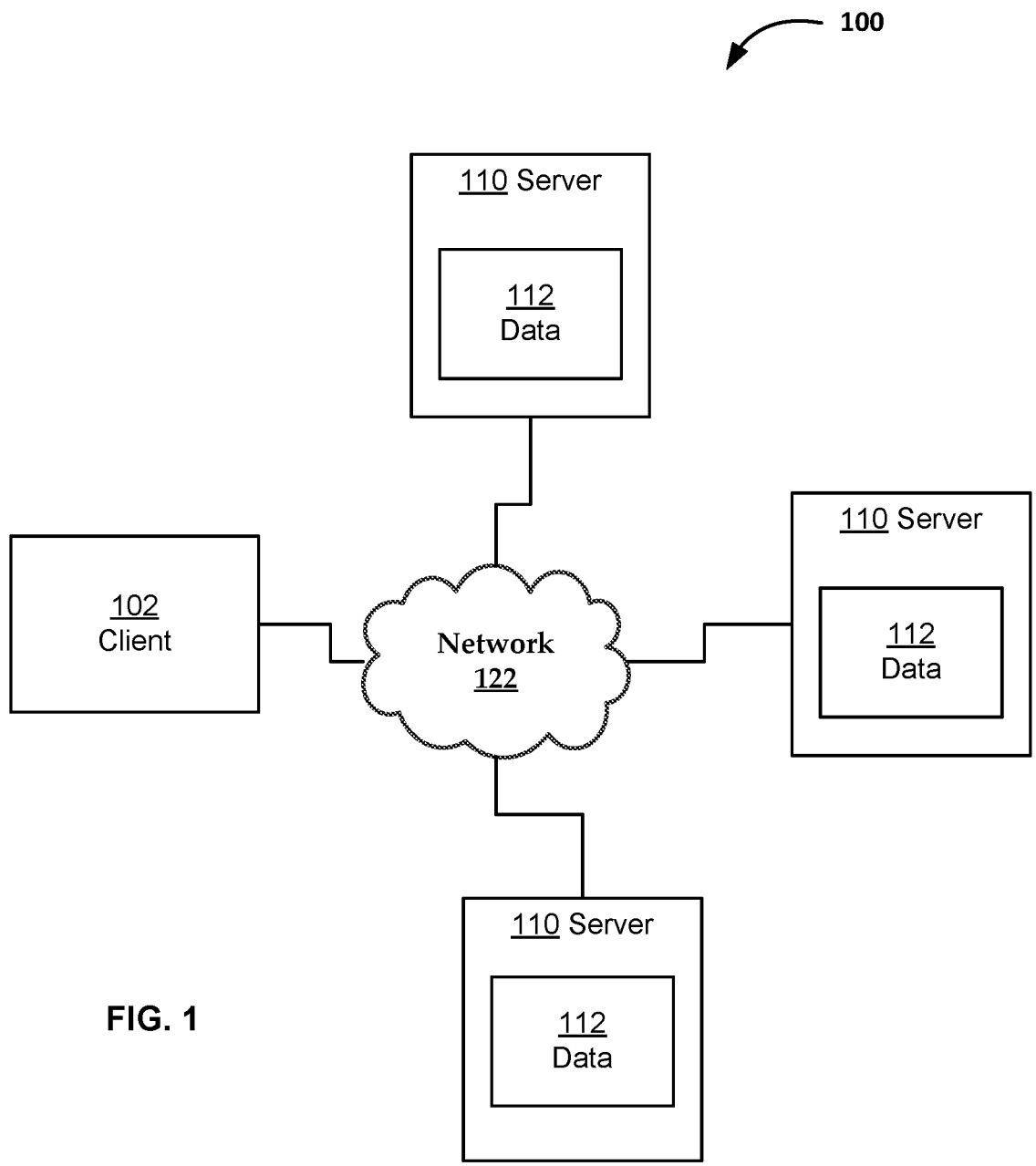
FIG. 1 illustrates an exemplary end-to-end encryption system, in accordance with aspects of the claimed technology.

FIG. 1 illustrates an exemplary end-to-end encryption system 100 in accordance with aspects of the claimed technology. The encryption system 100 may provide for end-to-end secure analytics, such as queries, using homomorphic encryption and dynamic channel techniques. The encryption system 100 of FIG. 1 includes a client 102 and one or more servers 110 that include data 112. FIG. 1 illustrates one client 102 and three servers 110 that include data 112. However, the encryption system 100 may comprise more than one client 102. Also, the encryption system 100 may comprise more servers 110 or fewer servers 110 that include data 112. In some embodiments, a plurality of clients 102 communicate encrypted analytics to one server 110 and receive encrypted responses from the server 110. In some embodiments, one client 102 communicates encrypted analytics to a plurality of servers 110 and receives encrypted responses from the plurality of servers 110. In some embodiments, one client 102 communicates encrypted analytics to one server 110 and receives encrypted responses from the server 110. In some embodiments, a plurality of clients 102 communicate encrypted analytics to a plurality of servers 110 and receive encrypted responses from the plurality of servers 110. In general, one or more clients 102 communicate encrypted analytics to, and/or receive encrypted responses from, one or more of servers 110. While in general, one or more clients 102 and one or more servers 110 is contemplated, where for simplicity the case of one client 102 and multiple servers 110 is illustrated elsewhere herein, it is no way intended to limit the practice of the claimed technology to a single client 102 and/or a plurality of servers 110. Thus, various descriptions of modules, acts, communications, and/or acts that are illustrated in the context of one client 102 for simplicity and clarity, may apply to multiple clients 102 and vice versa. Similarly, various descriptions of modules, acts, communications, and/or acts that are illustrated in the context of one client server 110 for simplicity and clarity, may apply to multiple servers 110 and vice versa.

The client 102 and servers 110 of FIG. 1 communicate via a network 122. In various embodiments, the network 122 is various combinations and permutations of wired and wireless networks (e.g., Ethernet, Wi-Fi, Bluetooth, mobile broadband, the Internet, etc.), internal/external computer busses, and/or the like. In some embodiments, one or more clients 102 communicate directly with one or more servers 110.

A target data source D may reside in data 112 on a single server 110 or may be distributed over data 112 in multiple servers 110 in the encryption system 100, in a plurality of distinct locations, which could include different blades in a server system, containers in a cloud, or servers that are geographically remote from one another, just as examples. Thus, the target data source D could be partly stored on the data 112, partly on a cloud (not illustrated), or the data source could be wholly stored on either. In various embodiments, the target data source distributed over one or more data 112 is unencrypted (in plaintext form), deterministically encrypted, semantically encrypted, and/or other similar formats that would be known to one of ordinary skill in the art with the present disclosure before them, or any combination thereof.

FIG. 1 illustrates three servers 110 that include data 112. However, the encryption system 100 may comprise more servers 110 or fewer servers 110. While a single client 102 is illustrated in the encryption system 100 of FIG. 1, in general the encryption system 100 may comprise multiple clients 102 or a client 102 that is implemented on multiple systems and/or locations. In some embodiments, one or more clients 102 communicate encrypted analytics to, and/ or receive encrypted responses from, one or more servers 110. In various embodiments, the server(s) 110 and the client(s) 102 are implemented in varied computing environments, including shared computing architectures, hybrid architectures, or distinct architectures such as those in a cloud computing environment.

Figure 2:
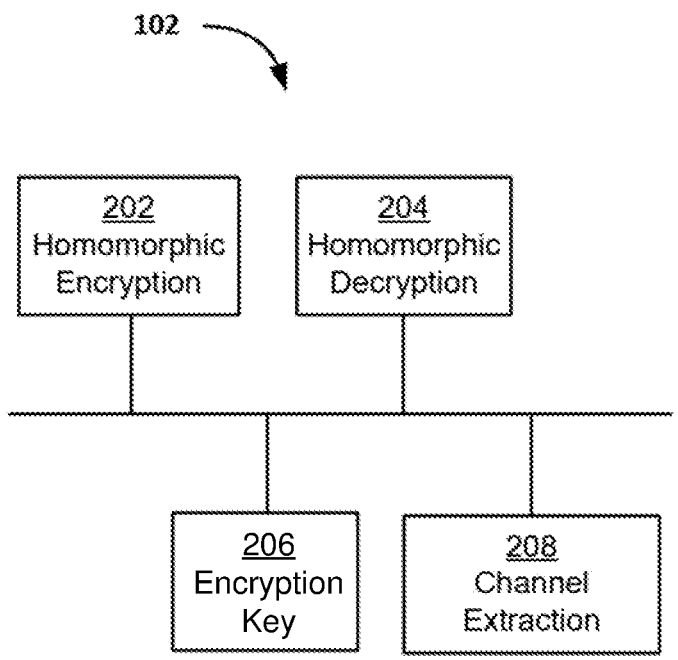
FIG. 2 illustrates details of a client of FIG. 1.

FIG. 2 illustrates details of the client 102 of FIG. 1. The client 102 includes a homomorphic encryption module 202 that homomorphically encrypts data such as an analytic using a homomorphic encryption scheme E and data channel techniques T. The client 102 further includes a homomorphic decryption module 204, and an encryption key 206. The homomorphic encryption module 202, homomorphic decryption module 204, and an encryption key 206 may be associated with a homomorphic encryption scheme E, such as Paillier encryption, or any other homomorphic encryption. The homomorphic encryption scheme E may be a fully or partially homomorphic encryption scheme. Examples of partially homomorphic cryptosystems include: RSA (multiplicative homomorphism), ElGamal (multiplicative homomorphism), and Paillier (additive homomorphism). Other partially homomorphic cryptosystems include the Okamoto-Uchiyama, Naccache-Stern, Damgård-Jurik, Sander-Young-Yung, Boneh-Goh-Nissim, and Ishai-Paskin cryptosystems. Examples of fully homomorphic cryptosystems include: the Brakerski-Gentry-Vaikuntanathan, Brakerski's scale-invariant, NTRU-based, and Gentry-Sahai-Waters (GSW) cryptosystems.

FIG. 2 illustrates a single encryption key 206. However, in some embodiments the encryption key 206 includes a public key and a private key. FIG. 2 further includes a channel extraction module 208 for extracting data from encrypted data by performing channel extraction techniques associated with the data channel techniques T.

An analytic (e.g., a query Q) may be evaluated using data within the target data source D. Using the homomorphic encryption scheme E and data channel techniques T, the encryption system 100 may encode the query Q as a homomorphically encrypted query Q_E using the homomorphic encryption module 202 and encryption key 206. The encrypted query Q_E is completely encrypted. The query Q cannot be recovered from encrypted query Q_E without using the encryption key 206, which is associated with encryption scheme E. The homomorphic decryption module 204 is configured to use the encryption key 206 to evaluate an operation K{Q_E, E}, which decrypts the encrypted query Q_E using the encryption scheme E and encryption key 206. The channel extraction module 208 is configured to use channel extraction techniques associated with the dynamic channel techniques T to perform channel extraction on encrypted results E(R) of evaluation of the query Q_E over a target data source.

The client 102 may send the encrypted query Q_E from the client 102 to one or more servers 110 containing the target data source in data 112. However, the client 102 does not send the encryption key 206 to any of the servers 110. Thus, servers 110 are not able to recover the encrypted query Q_E, without the encryption key 206.

Figure 3:
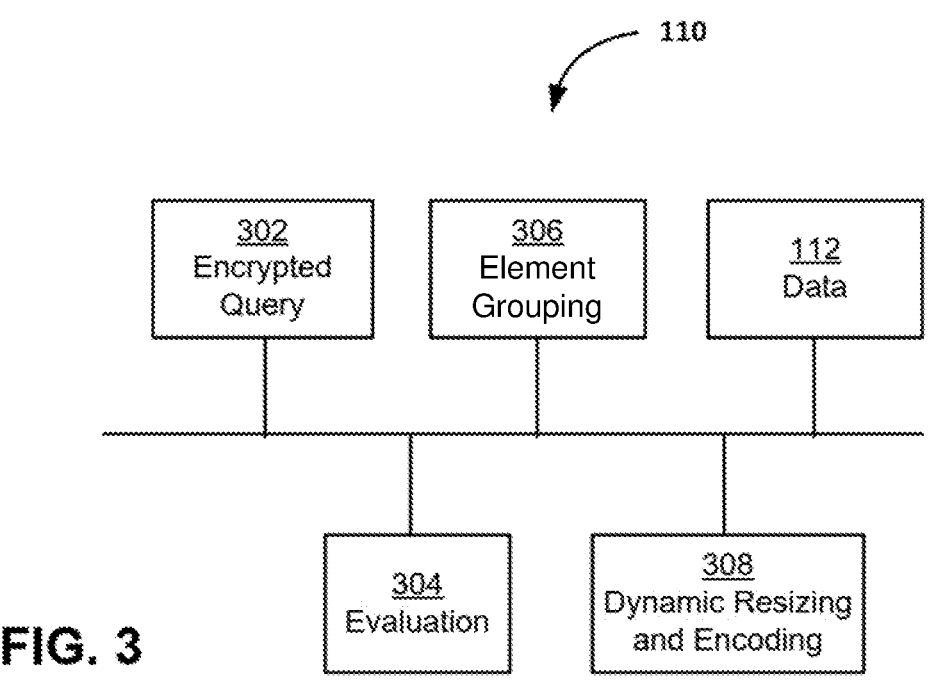
FIG. 3 illustrates details of a server of FIG. 1.

FIG. 3 illustrates details of the server 110 of FIG. 1. In addition to the data 112, the server 110 includes, the encrypted query (encrypted query 302) received from the client 102, an evaluation module 304, an element grouping module 306, and a dynamic resizing and encoding module 308 for dynamically resizing and encoding data into grouped byte channels of data elements using dynamic channel techniques T. The encrypted query 302 may be received from the client 102 without the encryption key 206. Thus, the server 110 is unable to recover or expose the query Q, because the server 110 is unable decrypt the encrypted query 302 without the encryption key 206. The evaluation of a homomorphically encrypted analytic (e.g., encrypted query 302) over data may produce an encrypted response that may be recovered using the encryption key 206.

Using techniques of the homomorphic encryption scheme E, one or more server 110 evaluates the encrypted query Q_E 302 over target data D, which resides within the one or more of, respectively, data 112. The evaluation may produce an encrypted response E(R).

As the evaluation module 304 evaluates the encrypted query Q_E 302 over the target data D, the element grouping module 306 is configured to group the most probable similar result elements of the target data D. The element grouping module 306 may co-locate the similar result elements of a group on the same computing device, e.g., at the same server 110. The element grouping module 306 may convert the similar result elements into byte streams.

The dynamic resizing and encoding module 308 dynamically resizes and encodes the byte streams of result elements into grouped byte channels of data elements using the dynamic channel techniques T. The evaluation module 304 then evaluates the encrypted query Q_E 302 over each dynamic byte channel of data elements, producing encrypted response E(R). The dynamic resizing and encoding of the byte streams of result elements into grouped byte channels of data elements using the dynamic channel techniques T reduces the size of the encrypted response E(R). The dynamic resizing and encoding of byte streams of result elements into grouped byte channels of data elements using the dynamic channel techniques T also reduces the amount of computation that needs to be performed by the evaluation module 304 to evaluate the encrypted query Q_E 302 over each dynamic byte channel of data elements and produce the response E(R).

The operations of grouping the elements, converting grouped elements into byte streams, dynamically resizing and encoding the byte streams of result elements into grouped byte channels using the dynamic channel techniques T, and evaluating the encrypted query Q_E 302 over each dynamic byte channel of data elements, are each performed without decrypting the encrypted query Q_E 302 at the server 110, and without revealing the unencrypted query Q to the owner of the data 112, an observer, or an attacker. This is because the encryption key 206 is not available at any of the one or more servers 110. Further, the operations of grouping the elements, converting grouped elements into byte streams, dynamically resizing and encoding the byte streams of result elements into grouped byte channels of data elements using the dynamic channel techniques T, and evaluating the encrypted query Q_E 302 over each dynamic byte channel of data elements, are each performed without decrypting the encrypted response E(R), or revealing the contents of the encrypted response E(R) to the owner of the data 112, an observer, or an attacker. This is also because the encryption key 206 is not available at any of the one or more servers 110.

The server 110 sends the encrypted response E(R) to the client 102. Using the encryption key 206 associated with encrypted query Q_E 302, the homomorphic decryption module 204 of the client 102 may apply the operation K{E(R), E} to the encrypted response E(R). The channel extraction module 208 may use the channel extraction techniques associated with the dynamic channel techniques T, to perform dynamic extraction on the encrypted response E(R). Thus, the client 102 uses the homomorphic decryption module 204 and the channel extraction module 208 to decrypt and perform channel extraction on the encrypted response E(R), to obtain the results R of the query Q.

In general, a server (e.g., server(s) 110) comprises one or more programs that share their resources with clients (e.g., client 102). Server programs may be implemented on one or more computers. A client may request content from a server or may request the server to perform a service function while not sharing any of the client's resources. Whether a computer is a client, a server, or both, is determined by the nature of the application that requires the service functions.

While a single client 102 is illustrated in the encryption system 100 of FIG. 1, in general the encryption system 100 may comprise multiple clients 102 that share the encryption key 206. For example, a first client 102 may encrypt an analytic using the homomorphic encryption scheme E. The encrypted analytic may be sent to one or more servers 110 with directions to return the encrypted response E(R) to a second client 102, where the response may be decrypted and extracted to obtain the response R of the query Q. In general, a plurality of clients 102 communicate encrypted analytics to, and/or receive encrypted responses from, a plurality of servers 110.

In some embodiments, the client 102 and/or servers 110 may implement an application programming interface (API) to formalize data exchange. Both client 102 and server 110 may reside in the same system, and client software may communicate with server software within the same computer.

In some instances, the functions of the client 102 and/or servers 110 are implemented within a cloud-based computing environment, not illustrated. The client 102 and/or servers 110 may be communicatively coupled directly or via the network 122 with a cloud based computing environment. In general, a cloud-based computing environment is an internet resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

Figure 4:
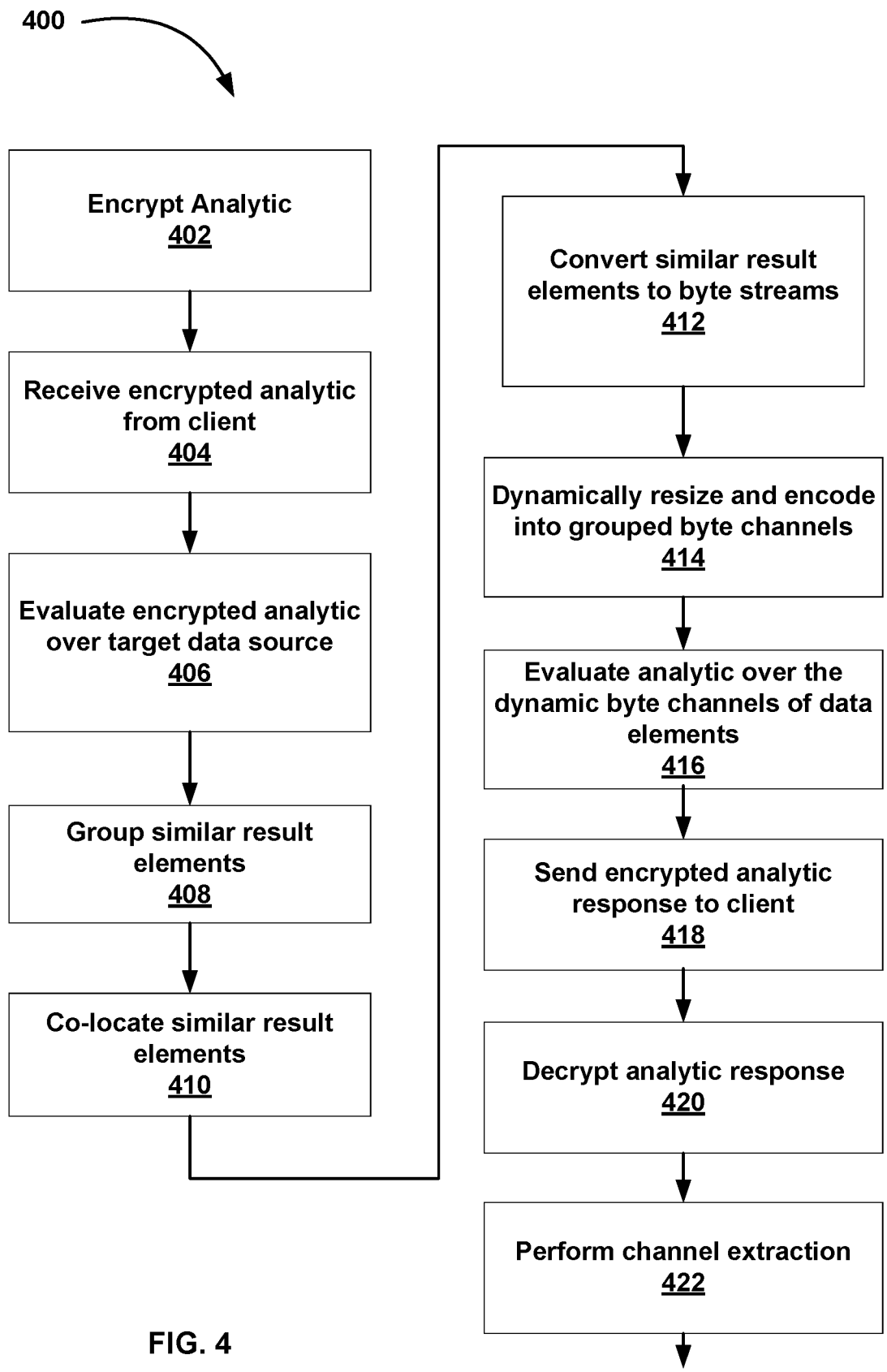
FIG. 4 is a flowchart illustrating an exemplary method for end-to-end encryption, in accordance with various aspects of the technology.

FIG. 4 is a flowchart of an exemplary method 400 for end-to-end encryption, in accordance with various aspects of the technology. The method comprises a step 402 of encrypting an analytic. In various embodiments, the analytic is a query, database access, database search, model, classifier, and/or the like. The analytic may be encrypted at one or more client(s) 102 using a homomorphic encryption scheme that uses dynamic channel techniques T. The encrypted analytic (referred to elsewhere herein as encrypted query Q_E 302) may be sent from the client 102 to the server 110 without the encryption key, e.g. encryption key 206. The method 400 comprises a step 404 of receiving the encrypted analytic from the client 102. The encrypted analytic may be received via a network, e.g., the Internet, at one or more servers 110.

The method 400 further comprises a step 406 of evaluating the encrypted analytic over a target data source to generate result elements. The target data source may reside in data 112 at one or more servers 110. The encrypted analytic may be evaluated without decrypting the encrypted analytic and without exposing the unencrypted analytic at the server 110 to the owner of the data 112, an observer, or an attacker. The method 400 further comprises a step 408 of grouping similar result elements. The method 400 also comprises a step 410 of co-locating similar result elements of a group on the same server. The grouping and co-location of the result elements may be based on a probability that the result elements are similar. The result elements may be grouped and co-located without decrypting any of the result elements. The method 400 also comprises a step 412 of converting similar result elements to byte streams. The similar result elements may be converted to byte streams without decrypting the byte streams.

The method 400 further comprises a step 414 of dynamically resizing and encoding result elements into grouped byte channels of data elements using the dynamic channel techniques T. The result elements may be dynamically resized and encoded into grouped byte channels without decrypting the encrypted analytic and without decrypting the encrypted result elements in the groups. The method then comprises a step 416 of evaluating the encrypted analytic over each dynamic byte channel of data elements to generate an encrypted response. The encrypted analytic may be evaluated over each dynamic byte channel without decrypting the encrypted analytic and without decrypting the encrypted response.

The method 400 further comprises a step 418 of sending the encrypted response to the client 102. The encrypted response may be sent from one or more servers 110 to the client 102 via the network 122. The method 400 also comprises a step 420 of decrypting and a step 422 of performing channel extraction on the encrypted response to obtain the results of the analytic. The step 420 may be performed using the homomorphic decryption module 204 using the private key associated with the encrypted analytic. The step 422 may be performed using the channel extraction module 208 to perform channel extraction techniques on the encrypted response using channel extraction techniques associated with the dynamic channel techniques T. Thus, the steps 420 and 422 use the private key and channel extraction techniques associated with the dynamic channel extraction T, to decrypt and perform channel extraction on the encrypted response to obtain results of the analytic.

Thus, using the method 400, the analytic may be evaluated over the target data source in a completely secure and private manner. Moreover, neither the contents nor the results of the analytic are revealed by the method 400 to the owner of the target data source, an observer, or an attacker.

Figure 5:
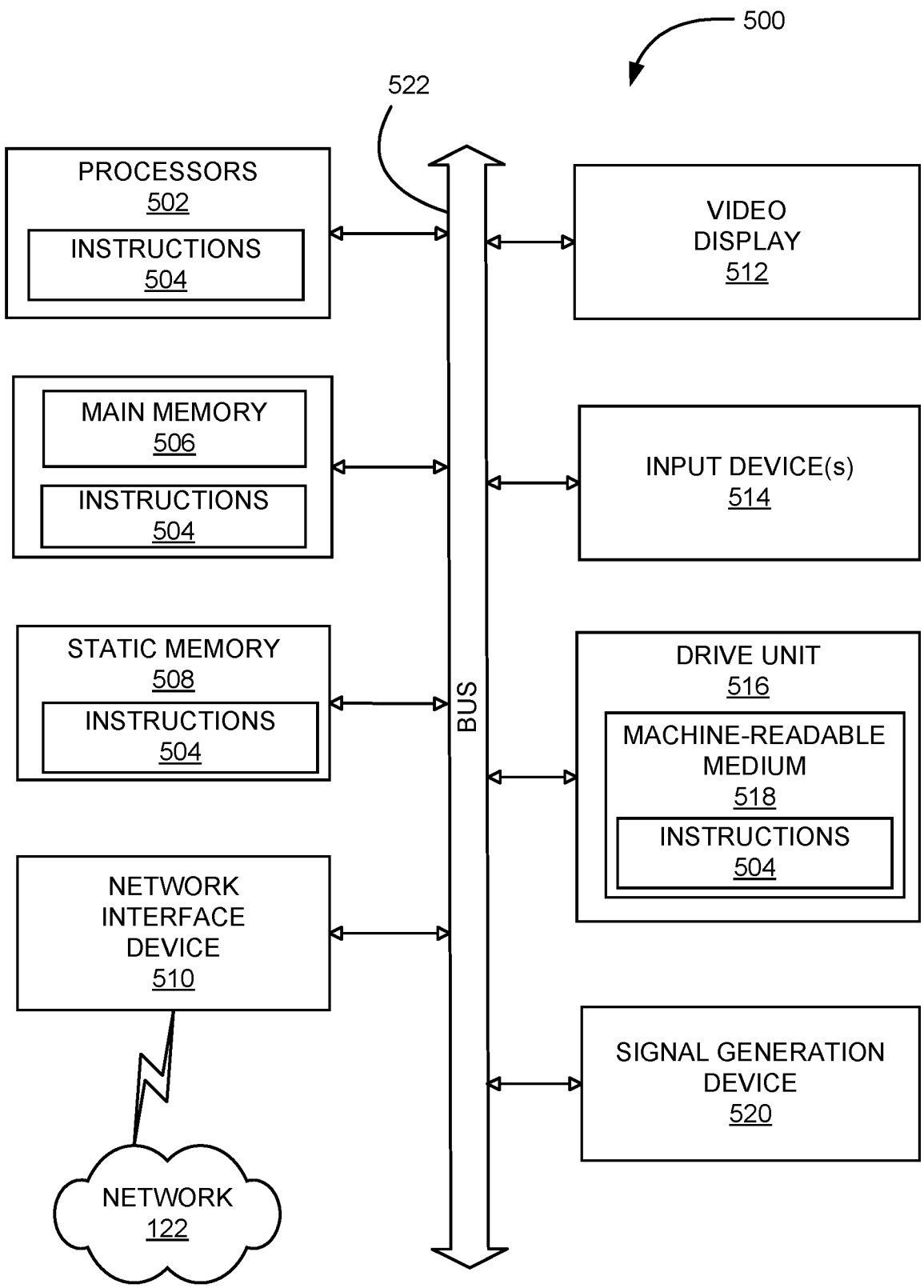
FIG. 5 is a schematic diagram of an exemplary computing system that is used to implement embodiments according to the present technology.

FIG. 5 is a diagrammatic representation of an example machine in the form of a computer system 500, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server (e.g. server 110) or a client (e.g., client 102) machine, in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated in FIG. 5, the term "machine" shall also be taken to include any collection of machines that individually or jointly execute a set (or multiple sets) of instructions to perform any one or more of the methodologies discussed herein The example computer system 500 includes a processor or multiple processor(s) 502 (e.g., a central processing unit (CPU), a graphics processing unit (GPU), or both), and a main memory 506 and static memory 508, which communicate with each other via a bus 522. The computer system 500 may further include a video display 512 (e.g., a liquid crystal display (LCD)). The computer system 500 may also include an alpha-numeric input device(s) 514 (e.g., a keyboard), a cursor control device (e.g., a mouse, trackball, touchpad, touch screen, etc.), a voice recognition or biometric verification unit (not shown), a drive unit 516 (also referred to as disk drive unit), a signal generation device 520 (e.g., a speaker), and a network interface device 510. The computer system 500 may further include a data encryption module (shown elsewhere herein) to encrypt data.

The disk drive unit 516 includes a computer or machine-readable medium 518 on which is stored one or more sets of instructions and data structures (e.g., instructions 504) embodying or utilizing any one or more of the methodologies or functions described herein. The instructions 504 may also reside, completely or at least partially, within the main memory 506 and/or within the processor(s) 502 during execution thereof by the computer system 500. The main memory 506 and the processor(s) 502 may also constitute machine-readable media.

The instructions 504 may further be transmitted or received over a network (e.g., network 122, see also FIG. 1) via the network interface device 510 utilizing any one of a number of well-known transfer protocols (e.g., Hyper Text Transfer Protocol (HTTP)). While the machine-readable medium 518 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and/or the like. The example embodiments described herein may be implemented in an operating environment comprising software installed on a computer, in hardware, or in a combination of software and hardware.

The corresponding structures, materials, acts, and equivalents of any means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art with this disclosure before them that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "co-located") may be occasionally interchangeably used with its non-hyphenated version (e.g., "co-located"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method comprising:
   receiving at one or more servers an encrypted analytic from one or more clients, the analytic encrypted using a homomorphic encryption scheme utilizing dynamic channel techniques;
   evaluating the encrypted analytic over a target data source without decrypting the encrypted analytic;
   grouping similar result elements of encrypted analytic evaluation;
   dynamically resizing and encoding the similar result elements into grouped byte channels of data elements using the dynamic channel techniques;
   evaluating the encrypted analytic over each of the dynamic byte channels of data elements to generate an encrypted response, without decrypting the encrypted response and without decrypting the encrypted analytic;
   sending the encrypted response from the one or more servers to the one or more clients; and
   decrypting and performing channel extraction at the one or more clients using channel extraction techniques associated with the dynamic channel techniques to obtain results of the analytic from the encrypted response.

2. The method of claim 1, further comprising co-locating two or more result elements of the target data source on the same server.

3. The method of claim 1, further comprising co-locating two or more groups of result elements on the same server based on a probability that the result elements are similar.

4. The method of claim 1, further comprising converting the grouped result elements into byte streams.

5. The method of claim 1, wherein grouping result elements of the target data source is based on a probability that the result elements are similar.

6. The method of claim 1, wherein the analytic is a model.

7. The method of claim 1, wherein the homomorphic encryption scheme is Paillier encryption.

8. The method of claim 1, wherein the analytic is a chain of series of operations to be performed over the target data source.

9. A system comprising:
   a client configured to:
      encrypt an analytic using a homomorphic encryption scheme that utilizes data channel techniques and an encryption key associated with the homomorphic encryption scheme,
      send the encrypted analytic to a server without the encryption key, decrypt an encrypted response using the homomorphic encryption scheme and the encryption key, and
      perform channel extraction on the encrypted response using channel extraction techniques associated with dynamic channel techniques; and
   the server configured to:
      receive the encrypted analytic without the encryption key from the client via a network,
      evaluate the encrypted analytic over a target data source without decrypting the encrypted analytic,
      group similar result elements of the target data source evaluation,
      dynamically resize and encode the similar result elements into grouped byte channels of data elements using the dynamic channel techniques,
      evaluate the encrypted analytic over each dynamic byte channel of data elements to generate the encrypted response, without decrypting the encrypted analytic and without decrypting the encrypted response, and
      send the encrypted response to the client for decryption and channel extraction on the encrypted response to obtain results of the analytic over the target data source.

10. The system of claim 9, wherein the server is further configured to co-locate similar result elements from another server.

11. The system of claim 9, wherein the client is further configured to perform channel extraction on the encrypted response to obtain the result of evaluating the analytic over the target data source.

12. The system of claim 9, wherein the server is further configured convert the result elements into byte streams.

13. The system of claim 9, wherein the result elements are grouped based on a probability that the result elements are similar.

14. The system of claim 9, wherein the analytic is a query.

15. The system of claim 9, wherein the analytic is a chain of series of operations to be performed over the target data source.

16. A non-transitory computer readable storage media having a program embodied thereon, the program being executable by a processor to perform a method for secure analytics of a target data source, the method comprising:

receiving an encrypted analytic from a client via a network, the analytic encrypted at the client using a homomorphic encryption scheme and a public encryption key that utilize data channel techniques, the encrypted analytic received without a corresponding private encryption key;

evaluating the encrypted analytic over the target data source to generate encrypted result elements without decrypting the encrypted analytic;

grouping similar result elements of the encrypted analytic evaluation without decrypting the result elements;

dynamically resizing and encoding the similar result elements into grouped byte channels of data elements using the data channel techniques;

evaluating the encrypted analytic over each dynamic byte channel of data elements to generate an encrypted response having a reduced size, without decrypting the encrypted analytic and without decrypting the encrypted response; and sending the encrypted response to the client, the encrypted response configured for decryption and channel extraction using channel extraction techniques associated with the dynamic data channel techniques, to obtain a result of the encrypted response.

17. The method of claim 16, further comprising co-locating two or more groups of result elements on a server based on a probability that the result elements are similar.

18. The method of claim 16, further comprising converting the grouped result elements into byte streams.

19. The method of claim 16, wherein grouping result elements of the target data source is based on a probability that the result elements are similar.

20. The method of claim 16, wherein the analytic is a query.

\* \* \* \* \*